United States Patent [19]

Wise

[11] 4,349,163
[45] Sep. 14, 1982

[54] CORELESS ROLL FILM STRUCTURE AND APPARATUS FOR WINDING THEREOF

[75] Inventor: David S. Wise, Solon, Ohio

[73] Assignee: McGraw-Hill, Inc., New York, N.Y.

[21] Appl. No.: 202,867

[22] Filed: Oct. 31, 1980

[51] Int. Cl.$^3$ .................... B65H 17/02; B65H 75/28
[52] U.S. Cl. .................................. 242/68.3; 242/74.2
[58] Field of Search .................. 242/55, 68.3, 67.1 R, 242/74, 74.1, 74.2, 71.2, 68.5, DIG. 3; 40/471, 478

[56] References Cited

U.S. PATENT DOCUMENTS

| | | | |
|---|---|---|---|
| 1,845,526 | 2/1932 | Spence | 242/74.2 |
| 2,282,016 | 5/1942 | Wittel | 242/68.3 |
| 2,638,284 | 5/1953 | Rohfuse | 242/74.2 |
| 3,167,270 | 1/1965 | Jones | 242/74.1 |
| 3,233,842 | 2/1966 | Grafton | 242/74.2 |

Primary Examiner—Edward J. McCarthy
Attorney, Agent, or Firm—Darby & Darby

[57] ABSTRACT

A roll of film is formed without a spool or core and the innermost end of the roll of film is formed into a closed loop of predetermined diameter. In a film viewing device, in which film is normally transported from a supply shaft to a take-up shaft, the supply shaft is provided with an adaptor which is mounted thereon for rotation therewith and is resiliently biased to be radially expandable from a diameter smaller than to a diameter larger than the predefined diameter. The roll film structure is mounted on the adaptor and the resilient biasing of the adaptor then forces it radially outward against the closed loop and securely holds the roll film for take-up. In a preferred embodiment the aforesaid adaptor comprises a stationary member adaptor to be mounted on the supply shaft or takeup shaft of a conventional viewing device, a pivotable member, means mounting the pivotable member to the stationary member for pivotal movement about an axis parallel to the shaft on which the stationary member is mounted, and resilient means mounted to urge the pivotable member away from be stationary member. The stationary and pivotable members are provided with opposed projections which are urged towards each other as the pivotable member is pivoted away from the stationary member. This construction permits the adaptor to be used not only on the supply shaft to receive a coreless roll film structure, but also as the reel on the take-up shaft.

12 Claims, 5 Drawing Figures

CORELESS ROLL FILM STRUCTURE AND APPARATUS FOR WINDING THEREOF

The present invention relates generally to roll film and the winding thereof, and more particularly, concerns a coreless or unspooled roll film construction and the winding thereof, for example, for viewing.

Micropublishing services are available in some industries, such as the construction industry, which periodically provide 35 mm microfilm of plans and specifications for bidding purposes. In the past, a roll of microfilm was wound on a plastic core or spool for mailing to subscribers. These spools were adapted to fit the rotating shafts of any conventional viewing equipment and each roll would typically be used by a subscriber until a new one was received, at which time, the old roll would be disposed of, together with its spool.

The use of a film spool with each roll of film resulted in two major shortcomings. First of all, since the film spools were discarded of along with each roll of film, they represented a continuous and not insubstantial expense. In addition, the weight of the film spool was comparable to that of the average roll of microfilm, so that postage or shipping expenses were unnecessarily high. By avoiding the use of a spool with each roll of film, it would be possible to achieve a substantial saving in cost.

It is therefore a broad object of the present invention to eliminate the need for providing a spool or core with each roll of film in, for example, microfilm used in micropublishing services, while the permitting the display of the film with any conventional displaying device. It is specifically contemplated that this object be achieved in some way other than simply reusing conventional spools which are provided with roll films, since this would require the tedious and time consuming removal of the spool from an old roll and its placement in a new roll.

It is another object of the present invention to provide a roll film structure which need not incorporate a film spool or core in order to be capable of being displayed on conventional viewing equipment.

It is yet another object of the present invention to provide an apparatus for use with conventional viewing equipment to permit viewing thereon of any number of roll film structures having no spool or core.

It is also an object of the present invention that the roll film structure and apparatus for use with viewing equipment be reliable and convenient in use, yet relatively simple and inexpensive in construction.

In accordance with one aspect of the invention, a roll of film is formed without a spool or core and the innermost end of the roll of film is formed into a closed loop of predetermined diameter. In the film viewing device, in which film is normally transported from a spool on a supply shaft to a spool on a takeup shaft, the supply shaft is provided with an adaptor which is mounted thereon for rotation therewith and is resiliently biased to be radially expandable from a diameter smaller than to a diameter larger than the predefined diameter. The roll film structure is mounted on the adaptor by contracting the same and sliding the roll film thereover so that the closed loop of the roll film surrounds the adaptor. The resilient biasing of the adaptor then forces it radially outward against the closed loop and securely holds the roll film for takeup on, for example, a conventional takeup reel and viewing in the usual manner.

In accordance with a further aspect of the invention, the aforesaid adaptor comprises a stationary member adapted to be mounted on the supply shaft or takeup shaft of a conventional viewing device, a pivotable member, means mounting the pivotable member to the stationary member for pivotal movement about an axis parallel to the shaft on which the stationary member is mounted, and resilient means mounted to urge the pivotable member away from the stationary member. The stationary and pivotable members are provided with opposed projections which are urged towards each other as the pivotable member is pivoted away from the stationary member. This construction permits the adaptor to be used not only on the supply shaft to receive a coreless roll film structure, but also as the reel on the takeup shaft. For this latter application, the stationary and pivotable members are forced together and the leading end of the film is inserted between their opposed faces, to be retained therebetween when the stationary and pivotable members are released. This permits the normal takeup of the roll film.

The foregoing brief description, as well as further objects, features and advantages of the present invention will be more completely understood from the following detailed description of a presently preferred, but nonetheless illustrative, embodiment in accordance with the present invention, with reference being had to the accompanying drawing wherein.

Figure 1:
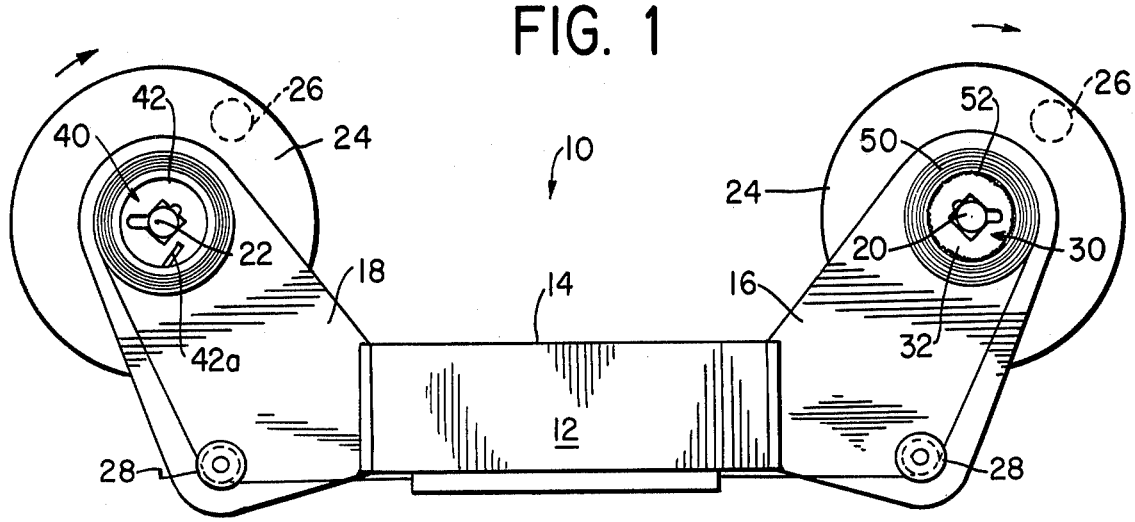
FIG. 1 is a front elevational view illustrating a conventional microfilm viewing device in which adaptors in accordance with the present invention have been mounted on the supply and takeup shafts and a coreless roll film in accordance with the present invention has been mounted thereto and has been partially unwound for normal viewing.

Referring now to the details of the drawing, FIG. 1 illustrates a conventional roll film viewing device 10, for example of viewing microfilm, in which the present invention has been utilized. The viewing device 10 includes a main body 12 on which the film is viewed at a top surface 14. Attached to the main body 12 are the arms 16, 18 on which the supply shaft 20 and take-up shaft 22, respectively, are mounted for rotation. Each of the shafts 20, 22 is coupled for rotation with a rotating, disc-shaped member 24 having a backwardly projecting (FIG. 1), freely rotatable handle 26, which rotating members permit manual viewing of the film. However, it will be appreciated that the invention may equally well be used with a motor-driven viewing apparatus.

On the supply shaft 20 is mounted an adaptor 30 in accordance with the present invention, and a second adaptor 40 of a similar type is mounted on the take-up shaft 22. A roll film structure 50 in accordance with the present invention is mounted so that its internal loop 52 is retained by the adaptor 30. The film from the roll film on adaptor 30 is routed over the rollers 28, 28 in a conventional fashion, and travels therefrom to the adaptor 40 mounted on take-up shaft 22.

In operation, the members 24, 24 are rotated in the directions indicated by the arrows shown in FIG. 1 in order to take up film from roll film structure 50 and are rotated in the opposite direction in order to rewind. It should be noted that the present invention permits use of an adaptor in accordance therewith for both the supply shaft 20 and the take-up shaft 22.

Figure 2:
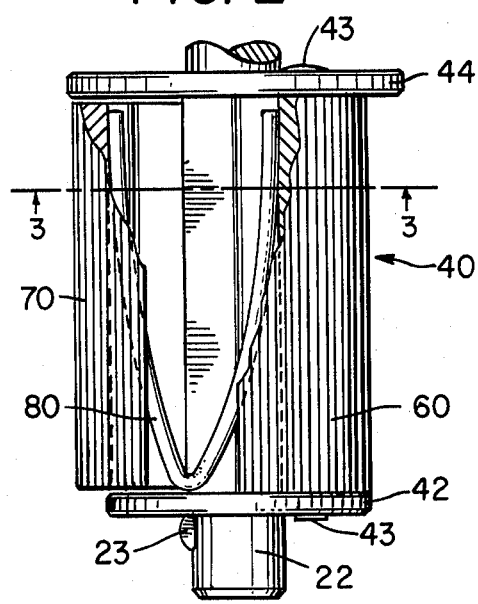
FIG. 2 is a top plan view, on an enlarged scale, of the adaptor mounted on the take-up shaft, with portions cut away to show some details of the internal construction thereof.
Figure 3:
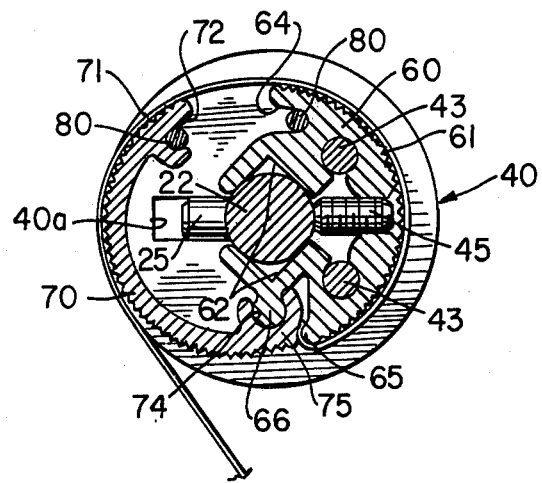
FIG. 3 is a sectional view, on an enlarged scale, of the adaptor mounted on the take-up shaft (e.g. along line 3—3 in FIG. 2)

Referring now to FIGS. 2 and 3, I illustrate further details of the construction of adaptor 40. The adaptor is mounted on take-up shaft 22 for rotation therewith. As is conventional, take-up shaft 22 includes a spring-loaded ball 23 acting as a detent mechanism to retain adaptor 40 against longitudinal movement on shaft 22. Also, a second detent mechanism 25 is provided which extends into an apperture 40a in adaptor 40 to aid in aligning the adaptor with respect to shaft 22 and to assist in retaining it against rotation with respect to the shaft.

Adaptor 40 broadly comprises three major components: a stationary member 60 which is adapted to be mounted on shaft 22 for rotation therewith; a pivotable member 70 which is mounted to stationary member 60 for pivotal movement with respect to an axis substantially parallel to the shaft 22; and a resilient member 80 mounted to exert a separating force to pivot the pivotable member 70 away from the stationary member 60. Adaptor 40 also includes end plates 42 and 44 which are secured to stationary member 40 by means of, for example, rivets 43, as well as a set screw 45, or the like, provided to secure stationary member 40 against inadvertent removal from shaft 22. It should also be noted that end plate 42 includes a slot 42a which will be discussed in further detail below.

The members 60 and 70 may be made of any strong, durable material, but are preferably made from aluminum by extrusion. On their outer surfaces, the members 60 and 70 are provided with sharp ribs, indicated respectively as 61 and 71, which serve to grip the roll film structure 50 and to prevent it from slipping with respect to the surfaces of the members 60 and 70. Stationary member 60 is preferably formed with an outside radius of curvature corresponding to a predefined diameter to be discussed further below. Internally, stationary member 60 includes a pair of opposed v-shaped grooves 62, 62 which permit it to be mounted on either a round or angular, for example square shaft. In the preferred embodiment, the shaft 22 is rounded, as is common. Near one of its extremes, stationary member 60 includes an undercut groove 64 for retaining the resilient spring member 80. In close proximity to, but spaced from the end 65 opposite the undercut 64, there is provided an outwardly protruding rib 66, the purpose of which will be discussed further below.

Like stationary member 60, pivotable member 70 is preferably provided with an outside radius of curvature corresponding to the predetermined diameter. At its upper end, member 70 includes an undercut groove 72 which aids in retaining the resilient spring member 80, in cooperation with the groove 64 of stationary member 60. Near its opposite end, pviotable member 70 includes a groove 74 which is dimensioned to receive the rib 66 of stationary member 60. The mouth of the groove 74 is, however, smaller than the maximum diameter of rib 66, to prevent pivotable member 70 from being pulled radially outwardly and away from rib 66. However, it will be appreciated that pivotable member 70 may be mounted to stationary member 60 by slipping the groove 74 edgewise over the rib 66 and sliding the pivotable member into alignment with the stationary member. After this is done, the rib 66 and groove 74 cooperate to form a hinge-type joint. After the end plates 42 and 44 are mounted, there can be no further relative movement between members 60 and 70. As the pivotable member 70 is pivoted with respect to the stationary member 60, the opposed ends 65, 75 of the members 60, 70 are separated as the pivotable member 70 is pivoted towards the stationary member 60 and move closer together as the pivotable member is pivoted away from the stationary member.

Resilient spring member 80 may be made of any appropriate strong material, but is preferably made of steel. It is mounted within and retained against movement by the grooves 64 and 72 of the members 60 and 70, respectively. In this position, it applies a force to pivotable member 70 which tends to separate it from stationary member 60. This force moves the pivotable member away from the stationary member until the ends 65, 75 engage to prevent further movement. From this description, it will be appreciated that the ends 65, 75 act essentially as gripping jaws, which separate when the upper ends of the members 60 and 70 are pressed together and would grip whatever is placed between them when the upper ends of these members are released.

In practice, the slot 42a in end plate 40 is aligned with the end 65 of the stationary member 60. To use the adaptor 40, the ends of the members 60, 70 which include the grooves 64 and 62, respectively, are pressed together and the end of the film from roll film structure 50 is inserted into slot 42a (and therefore between the ends 65 and 75 of the members 60 and 70, respectively). When the ends of the members 60, 70 are released, the force from spring member 80 forces them apart and clamps the end of the film between the ends of 65 and 75 (see e.g. FIG. 3). As the adaptor 40 is rotated to take up film from the roll film structure 50, the film initially asserts a force against pivotable member 70 which tends to separate it from stationary member 60 and therefore increases the clamping force with which the end of the film is held between the ends 65 and 75. As the adaptor reaches the position shown in FIG. 3, this effect is reduced, but the force of spring 80 is sufficient to retain the film securely between the ends 65 and 75. Thereafter, consecutive layers of film are wound on top of each other, so that there is no longer any danger of the end of the film being pulled out from between the ends of 65 and 75.

Figure 4:
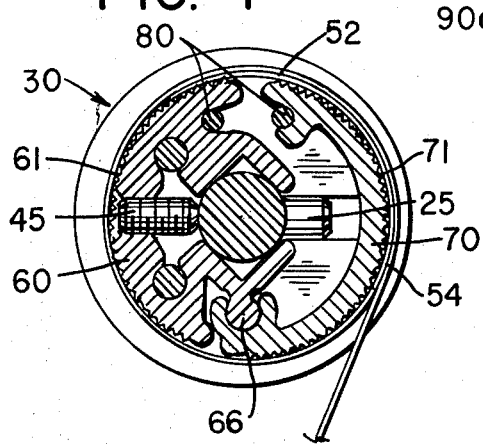
FIG. 4 is a sectional view, on an enlarged scale, of the adaptor mounted on the supply shaft (e.g. along line 3—3 in FIG. 2 when looking in the direction opposite the arrows)

FIG. 4 illustrates the details of adaptor 30. It should be noted that adaptor 30 is constructed from the same elements (i.e. stationary member 60, pivotable member 70 and resilient member 80) as adaptor 40, the only difference being the orientation of the members 60 and 70. Specifically, the members 60 and 70 are interchanged in position and are effectively rotated about a vertical axis lying in the plane of the drawing. Otherwise, the construction and cooperation of the members 60 and 70 is identical, except that they are used in a different manner, as will be explained in detail below. In addition, the adaptor 30 has an end plate 32 which does not have a slot like slot 42a of adaptor 40, but which, instead, is shaped to be smaller than the predetermined diameter. This permits slipping a loop of film of the predetermined diameter over the end plate 32.

FIG. 4 illustrates the adaptor 30 with the roll film structure 50 mounted thereon, but entirely unwound. Under these circumstances, the loop 52 of the roll film structure (which has the predetermined diameter internally) remains on adaptor 30. The spring 80 which applies a separating force between the members 60 and 70 then forces the ribs 61 and 71 of these members into firm contact with the interior of the loop 52, thereby preventing the loop from slipping with respect to the adaptor 30. It should be noted that the members 60 and 70 are preferably formed so as to have radii of curvature corresponding to the predetermined diameter which is the interior diameter of the loop 52 for maximum contact therewith. In addition, the members 60 and 70 are constructed so as to cooperatively define a diameter less than the predetermined diameter when compressed together and greater than the predetermined diameter when fully extended by the spring 80 (see e.g. FIG. 3). This permits convenient initial mounting of the roll film structure 50 on the adaptor 30 by compressing the members 60 and 70 and slipping the loop 52 over the compressed members. When the compressed members are released they will bear against the interior surface of the loop 52. If necessary, the structure 50 can easily be forced further onto the adaptor 30 by holding the member 24 and rotating the structure 50 counter-clockwise with respect thereto and simultaneously urging it rearwardly (in FIG. 1). This rotation tends to move pivotable member 70 towards stationary member 60, thereby decreasing the retaining force on the interior of the loop 52 and permitting it to be slid further onto the adaptor 30.

It should be noted that the construction of adaptor 30 will positively prevent clockwise rotation of the roll film structure 50 with respect to the adaptor 30, as long as the loop 52 is approximately the correct diameter and does not exceed the maximum diameter to which the adaptor can expand. Any impending rotation of the loop 52 with respect to the adaptor 30 tends to move the pivotable member 70 away from the stationary member 60, thereby adding to the force applied by the spring 80 and increasing the frictional force holding the interior of the loop 52. However, once the film is rewound onto the roll film structure 50, the roll film is easily removed from the adaptor 30 by rotating it counter-clockwise with respect thereto and at the same time pulling it away from the adaptor. As previously explained, this collapses the members 60 and 70 towards each other and permits withdrawal of the loop 52.

Figure 5:
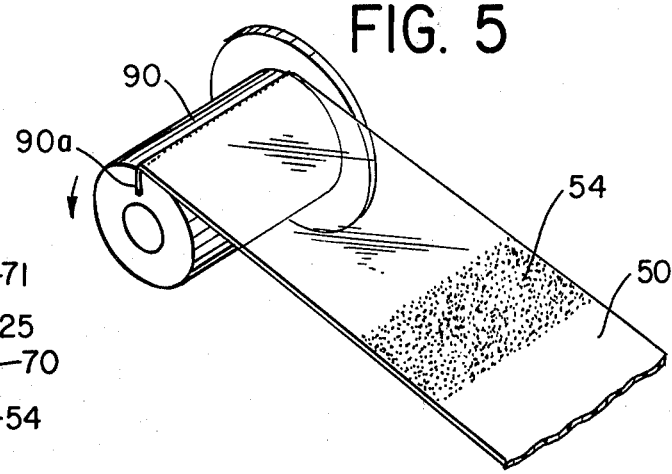
FIG. 5 illustrates a preferred method for forming the closed loop on the inner end of the roll film structure in accordance with the present invention.

FIG. 5 illustrates the preferred method for constructing a roll film structure 50 in accordance with the present invention. This is performed with the aid of a mandrel 90 having a diameter equal to the predetermined diameter. The end of the film which is to become the innermost end of the roll film structure is inserted into a slot 90a in the mandrel and is retained therein, either by friction or a small amount of adhesive. An adhesive strip 54 is applied to the top surface of the film at a position calculated to fall within the first layer of film wound onto the mandrel 90 and preferably including the end of the film. Thus, as the second layer of film is wound onto the mandrel, it will stick to the first layer as a result of the adhesive strip 54 and form the closed loop 52. Thereafter, the operator continues to turn the mandrel 90 as indicated by the arrow in FIG. 5 until the entire roll of film is wound onto the mandrel. The operator can then cut the end of the film and hold it while the mandrel continues to rotate. As a result, the end of the film within slot 90a is withdrawn therefrom and the rotating mandrel forces the end into contact with the next layer, thereby making it adhere to that layer. Then, the entire roll film may be removed from the mandrel 90.

Although preferred embodiments of the invention have been disclosed for illustrative purposes, it will be appreciated by those skilled in the art that many additions, modifications and substitutions are possible without departing from the scope and spirit of the invention as defined by the accompanying claims.

What is claimed is:

1. A coreless roll film structure composed of a strip of film having an innermost and outermost end and comprising a fixed, closed loop of predetermined diameter formed at said innermost end.

2. In combination with a roll film structure composed of a strip of film having an innermost and outermost end and a closed loop of predetermined diameter formed at said innermost end, an adaptor for use in a film viewing device in which film is normally transported from a supply shaft to a take-up shaft, said adaptor comprising:
   means for mounting said adaptor to one of said supply shaft and said take-up shaft for rotation therewith;
   a movable member on said adaptor mounted for movement towards and away from said shaft so as to vary the diameter of said adaptor from a value less than said predetermined diameter to a value greater than said predetermined diameter; and
   resilient means urging said movable member in a direction away from said shaft.

3. The combination in accordance with claim 2 wherein said adaptor further comprises a stationary member adapted to be mounted on said one shaft for rotation therewith and means mounting said movable member to said stationary member for pivotal movement about an axis substantially parallel to said one shaft.

4. The combination in accordance with claim 3 wherein said mounting means comprises a protruding rib on one of said stationary and movable members and a groove on the other of said members constructed and arranged to receive said rib, said groove conforming substantially to the cross-sectional shape of said rib and having a mouth narrower than the largest cross-sectional dimension of said rib, whereby said rib may not be withdrawn from said groove subsequent to being inserted therein.

5. The combination in accordance with claim 4 wherein said adaptor further comprises a first end portion formed on said stationary member and a second end portion formed on said movable member, said end portions being positioned to separate when said movable member is pivoted towards said stationary member and to move towards each other, and ultimately into engagement, as said movable member pivots away from said stationary member.

6. The combination in accordance with claim 5 comprising a first adaptor mounted on said supply shaft and having at least said loop of said roll film structure mounted thereon and a second adaptor mounted on said take-up shaft and having said outermost end of said film pressed between the first and second end portions thereof.

7. An adaptor for use with a viewing device for a film strip in the form of a roll film, said film strip being wound from a supply shaft to a take-up shaft on said device, said adaptor comprising:
- a stationary member adapted to be mounted on one of said shafts;
- a pivotable member;
- means mounting said pivotable member to said stationary member for pivotal movement about an axis parallel to the shaft on which said stationary member is to be mounted; and
- resilient means mounted to urge said pivotable member away from said stationary member.

8. The adaptor of claim 7 further comprising a first projection on said stationary member and a second projection on said pivotable member, said first and second projections being positioned to move away from each other as said pivotable member is pivoted towards said stationary member and to move towards each other when said pivotable member is moved away from such stationary member, said first and second projections coming into engagement when said pivotable member is maximally pivoted away from said stationary member.

9. An adaptor in accordance with either of claims 7 or 8 constructed for use with a roll film structure having a closed internal loop of predetermined diameter, said stationary and pivotable members having radii of curvature corresponding to said predetermined diameter and being constructed so as to cooperatively define a variable diameter core for said roll film structure capable of adjusting from a diameter less than said predetermined diameter to a diameter greater than said predetermined diameter.

10. The combination in accordance with any one of claims 2-6 wherein said movable member and said stationary member have radii of curvature corresponding to said predetermined diameter.

11. A method for forming a roll film structure in accordance with claim 1, comprising the steps of:
- securing said innermost end to a rotatable, cylindrical member having an outside diameter equal to said predetermined diameter;
- placing an adhesive substance on the upper surface of said film at a position calculated to fall within the first layer of said film on said rotating shaft; and
- winding said film onto said shaft in consecutive layers over said first layer, whereby said adhesive material forms a closed loop of said predetermined diameter.

12. The method of claim 1 further comprising the step of continuing to rotate said shaft while retaining said film to prevent further winding thereof after substantially all of said film is wound onto said member, whereby the innermost end of said film is released from said member, permitting removal of said roll film structure therefrom.

* * * * *